May 2, 1944. J. C. CROWLEY 2,348,111
TORCH
Original Filed June 16, 1939
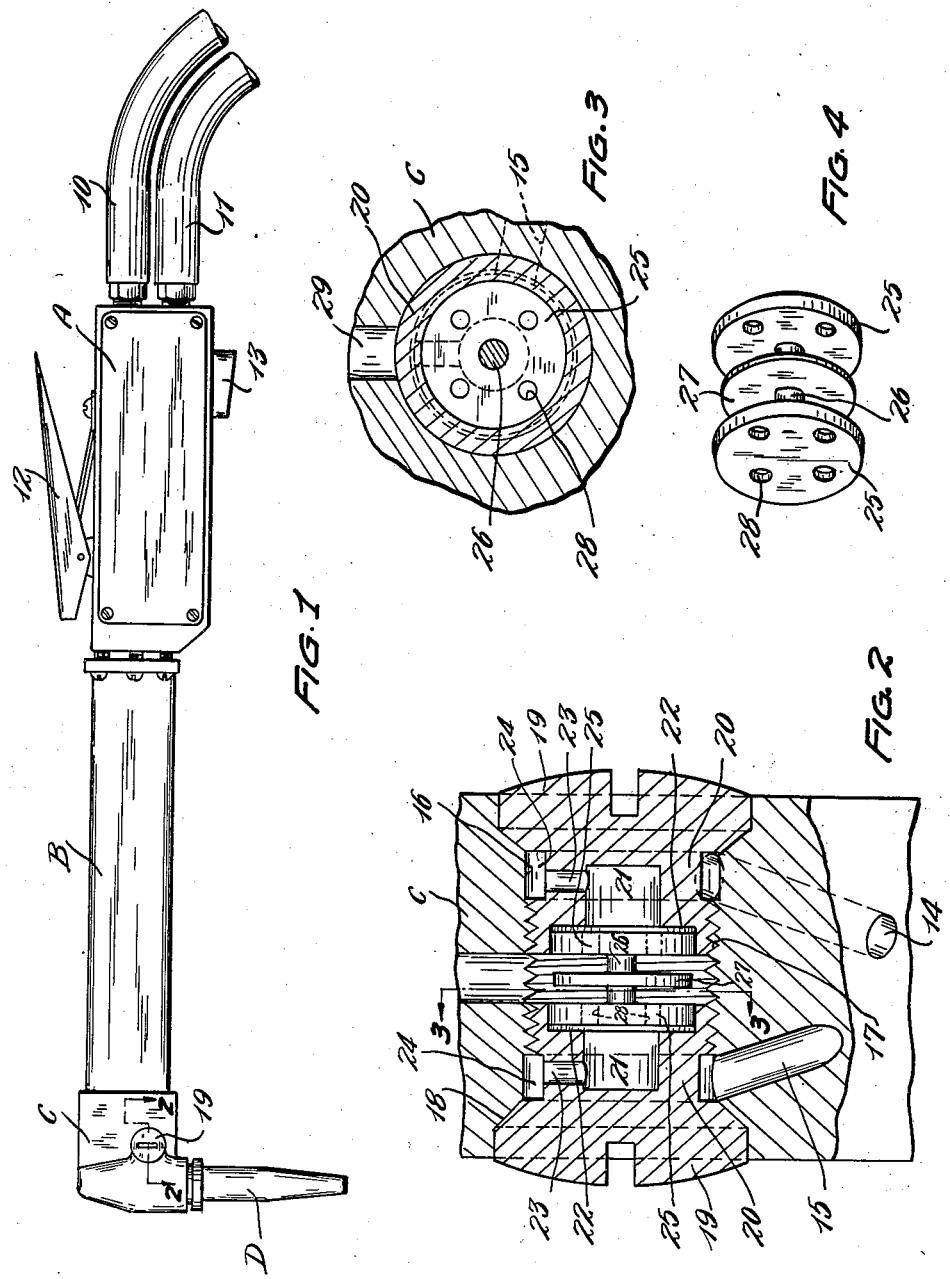
INVENTOR.
JOHN C. CROWLEY
BY Kwis Hudson & Kent
ATTORNEYS Patented May 2, 1944

2,348,111

UNITED STATES PATENT OFFICE 2,348,111

TORCH

John C. Crowley, Cleveland Heights, Ohio, assignor to The Dill Manufacturing Company, Cleveland, Ohio, a corporation of Ohio Original application June 16, 1939, Serial No. 279,499. Divided and this application March 26, 1941, Serial No. 385,289

6 Claims. (Cl. 158—27.4)

This invention relates to a cutting torch or blow pipe adapted for cutting or welding metal or for other similar purposes. More particularly the invention relates to the chamber in the torch wherein gases are mixed to form a combustible mixture.

This application is a division of my application Serial No. 279,499, filed June 16, 1939.

A cutting torch or blow pipe of the type to which the present invention relates is connected to a source of suitable inflammable gas under pressure and also to a source of oxygen under pressure, the gas and oxygen being suitably mixed in the torch to produce the required and correct combustible mixture.

There is also provision in the torch for issuing therefrom a jet of high pressure oxygen that is not mixed with the inflammable gas. When a torch of this kind is used to cut metal the metal is first preheated by means of the flame produced at the end of the tip of the torch by the ignited combustible mixture of gas and oxygen, and after the metal has been sufficiently heated the jet of the high pressure oxygen is directed against the metal and acts to destroy the carbon in the metal and to effect a severing thereof. When the torch is used for the welding of metal it is only necessary to employ the flame of the ignited combustible mixture of oxygen and gas.

An object of the invention is to provide in a cutting torch of the character specified an improved mixing chamber for the combustible mixture.

Another object is to provide in a cutting torch of the character specified and having a head to which the nozzle or tip of the torch is connected as is also the body of the torch an improved mixing chamber for the combustible mixture located in said head.

A more specific object is to provide in the head of the cutting torch or blow pipe and improved mixing chamber for the low pressure gas and oxygen and which chamber can be closed by separate orifice plugs individually removable from the head from opposite sides thereof, while a removable mixing member is arranged in the chamber and is provided with a baffle separating the inflowing low pressure inflammable gas and oxygen.

Further and additional objects and advantages not hereinbefore referred to and including simplicity of design and assembly of the elements constituting the mixing chamber of the torch will become more apparent hereinafter during the detailed description which is to follow of an embodiment of the invention.

Referring to the accompanying drawing,

Fig. 1 is an elevational view on a reduced scale of a cutting torch embodying the invention.

Fig. 2 is a sectional view through the head of the cutting torch or blow pipe and the mixing chamber therein and is taken substantially on irregular line 2—2 of Fig. 1 looking in the direction of the arrows, Fig. 2 being on a larger scale than Fig. 1.

Fig. 3 is a fragmentary sectional view taken substantially on line 3—3 of Fig. 2 looking in the direction of the arrows, and Fig. 4 is a detail perspective view of the removable mixing member which is mounted in the mixing chamber.

The cutting torch or blow pipe shown in Fig. 1 comprises a handle A and a hand grip portion B connecting the handle A with the head C that has secured therein the tip or nozzle D. The handle A comprises a body that is provided with passages for oxygen and inflammable gas. These passages are connected through suitable fittings to conduits 10 and 11 extending, respectively, to a source of oxygen under pressure and a source of inflammable gas under pressure.

The passages in the body of the handle A comprise a passage for high pressure oxygen used to form the cutting jet and the flow through said passage is controlled by the operator by means of a valve operating lever 12. The passages in the body or handle A also include a passage for oxygen and a passage for inflammable gas and which are ultimately commingled or mixed into a combustible mixture. These latter passages may be controlled by valves which are simultaneously operated by a valve operating member or lever 13. The oxygen and inflammable gas for the combustible mixture after passing the valves controlled by the member 13 flow to means also located in the handle A and automatically regulating the flow pressures of the gas and oxygen.

The hand grip portion B which connects the handle A and the head C of the torch is provided with three conduits which may be in the form of tubes and connecting, respectively, with the passage for the high pressure oxygen and the passages for the oxygen and inflammable gas for the combustible mixture.

The construction of the handle A including the passages therein, the valves and the automatic flow pressure regulating means referred to and also the construction of the hand grip portion B are fully illustrated and described in my said application Serial No. 279,499, of which the present application is a division. Therefore these parts need not be further described herein.

As already stated, the torch can be used as a cutting torch or simply as a welding torch. In either use it is necessary to properly mix the oxygen and inflammable gas to provide the flame for preheating the metal to be cut or the flame for effecting the welding of the metal. In order to obtain this proper mixing or commingling of the oxygen and inflammable gas to provide the desired combustible mixture the head C embodies a mixing chamber which will now be described.

The head C is provided with angularly disposed passages 14 and 15 and these passages are connected with the conduits in the hand grip portion B through which flows the oxygen and inflammable gas, the flow pressures of which have been regulated by the automatic means in the handle A. The passages 14 and 15 extend to the mixing chamber in the head C and said chamber is in the form of a cylindrical opening 16 extending transversely of the head and threaded adjacent its middle portion as indicated at 17, while its outer ends are conical in shape, as indicated at 18, to receive the conical heads 19 of separate orifice plugs 20 that are removably screwed into the opening 16 from opposite sides of the head.

The plugs 20 are provided with bores 21 and counterbores 22 concentric thereto. The bores 21 are connected by passages 23 with the annular spaces 24 between the outer periphery of the plugs 20 and the wall of the opening 16 intermediate the conical heads 19 of the plugs and the threaded portions thereof, it being noted by reference to Fig. 2 that the passages 14 and 15 communicate with the annular spaces 24. A removable mixing member is mounted in the mixing chamber and comprises disks 25 mounted on the opposite ends of a pin 26, and said disks slidably fit the counterbores 22 of the plugs 20. The disks 25 may be separate from the pin 26 and fixedly secured to the same, or they may be formed integrally with said pin. The pin 26 midway between the disks 25 carries a baffle plate 27 in the form of a disk of slightly less diameter than the disks 25. The latter disks are provided with a plurality of openings or ports 28 through which the oxygen and gas pass to the center of the mixing chamber. The oxygen and gas passing through the ports 28 to the center of the mixing chamber strike the baffle 27 which creates a turbulence in the oxygen and gas and thus the oxygen and gas are thoroughly mixed in the mixing chamber before passing therefrom through the passage 29 to the tip or nozzle D.

From the foregoing description it will have been seen that the oxygen and gas first entering the mixing chamber from the passages 14 and 15 pass into the annular spaces 24 wherein they will have a whirling motion. From the spaces 24 the oxygen and gas pass through the passages 23 into the bores 21 and counterbores 22 and thence through the ports 28 and against the baffle 27.

As already stated, this arrangement is such that a turbulence is created in the incoming oxygen and gas which causes the same to become thoroughly mixed and commingled in the mixing chamber.

It will also have been noted that the mixing chamber is of simple construction and the parts thereof can be readily assembled and disassembled, thus effecting manufacturing advantages and also advantages in the proper maintenance of the torch.

Although a preferred embodiment of the invention has been illustrated and described herein the invention is susceptible of various modifications and adaptations within the scope of the appended claims.

Having thus described my invention what I claim is:

1. In a torch of the character described a torch head having passages therein for oxygen and an inflammable gas to form a combustible mixture, said head being provided with a mixing chamber extending therethrough and in which said passages terminate, removable plugs mounted in the opposite ends of said mixing chamber, and means supported by said plugs and constituting a baffle between the oxygen and gas coming into the mixing chamber.

2. In a torch of the character described a torch head having passages therein for oxygen and an inflammable gas to provide a combustible mixture, said head being provided with a mixing chamber extending therethrough and in which said passages terminate, removable plugs mounted in the opposite ends of said mixing chamber and provided with passages communicating at their opposite ends with said chamber, and means supported by the adjacent ends of said plugs and including a baffle located substantially centrally of said chamber and interposed between the oxygen and gas passing from said plugs into said chamber.

3. In a torch of the character described a torch head having passages therein for oxygen and an inflammable gas to provide a combustible mixture, said head being provided with a mixing chamber extending therethrough, said passages terminating in said mixing chamber, a third passage leading from said mixing chamber to conduct the combustible mixture to the torch tip or nozzle, removable plugs mounted in the opposite ends of said mixing chamber, said plugs defining with the wall of said chamber annular spaces at the points where said first named passages terminate in said chamber, said plugs being provided with bores and counterbores in communication with each other and connected with said spaces by a passage, and a mixing member comprising interconnected spaced parallel disks mounted in said counterbores of said plugs, and a baffle disk located intermediate said spaced parallel disks and adjacent to the last named passage in said head, said first named disks being provided with ports therethrough.

4. In a torch of the character described a torch head having passages therein for oxygen and an inflammable gas to provide a combustible mixture, said head being provided with a mixing chamber extending therethrough, said passages terminating in said mixing chamber, a third passage leading from said mixing chamber to conduct the combustible mixture to the torch tip or nozzle, removable plugs mounted in the opposite ends of said mixing chamber, said plugs defining with the wall of said chamber annular spaces at the points where said first named passages terminate in said chamber, said plugs being provided with bores and counterbores in communication with each other and connected with said spaces by a passage, and a mixing member comprising interconnected elements mounted in the counterbores of said plugs and provided with openings therethrough.

5. In a torch of the character described a torch head provided with a mixing chamber extending therethrough, said head having passages therein for oxygen and an inflammable gas and terminating in said chamber adjacent the opposite ends of the latter, said head also having a passage therein leading from said chamber intermediate the opposite ends of the latter, and removable plugs for closing the opposite ends of said chamber and provided with passages therethrough, said passages in said plugs placing the opposite ends of said chamber in communication with the central portion of said chamber.

6. In a torch of the character described a torch head having passages therein for oxygen and an inflammable gas to form a combustible mixture, said head being provided with a mixing chamber extending therethrough and in which said passages terminate, removable plugs mounted in the opposite ends of said mixing chamber, and removable means located in said chamber intermediate said plugs and constituting a baffle between the oxygen and gas coming into the mixing chamber.

JOHN C. CROWLEY.